United States Patent

Klapprott et al.

[15] 3,678,131

[45] July 18, 1972

[54] ADHESIVE COMPOSITIONS CONTAINING EPOXY RESIN, CARBOXYL CONTAINING COPOLYMER AND 2,2,-BIS-(4-HYDROXYPHENYL) SULFONE

[72] Inventors: David K. Klapprott; Daniel L. Paradis, both of Concord, Calif.

[73] Assignee: The Dexter Corporation, Pittsburg, Calif.

[22] Filed: Sept. 10, 1970

[21] Appl. No.: 71,269

[52] U.S. Cl..............260/837 R, 260/28.5 AS, 260/28.5 B, 260/28.5 D, 260/31.6, 260/32.8 EP, 260/33.2 EP, 260/33.4 EP, 260/33.6 EP, 260/33.8 EP, 260/47 EC, 260/47 EN, 260/830 TW, 260/836, 156/330, 161/184, 161/185, 161/186
[51] Int. Cl..............................................C08g 45/04
[58] Field of Search.........................260/836, 837

[56] References Cited

UNITED STATES PATENTS

| 2,947,338 | 8/1960 | Reid | 260/836 |
| 3,030,332 | 4/1962 | Lombardi | 260/836 |
| 3,312,754 | 4/1967 | Marks | 260/837 |
| 3,367,990 | 2/1968 | Bremmer | 260/831 |

*Primary Examiner*—Paul Lieberman
*Attorney*—Fulwider, Patton, Rieber, Lee & Utecht

[57] ABSTRACT

The disclosure describes new adhesive compositions having improved toughness and excellent high temperature shear strength comprising the reaction product of a major amount of a polyepoxide with a minor amount of a reactive carboxyl group containing polymer and 2,2-bis(4-hydroxyphenyl)sulfone.

15 Claims, No Drawings

3,678,131

ADHESIVE COMPOSITIONS CONTAINING EPOXY RESIN, CARBOXYL CONTAINING COPOLYMER AND 2,2,-BIS-(4-HYDROXYPHENYL) SULFONE

BACKGROUND OF THE INVENTION

The present invention relates to novel polyepoxide compositions. More particularly the present invention relates to a novel polyepoxide compositions useful as adhesives.

Good adhesive and laminating properties can generally be obtained from adhesives made with polyepoxide resins. While many of these adhesives show excellent textile shear strength at ambient temperatures, such shear strengths rapidly decrease with increasing temperature. The aircraft and aerospace industries have long sought an adhesive composition suitable for use where high temperature, i.e., 250°F, shear strength and toughness are necessary.

SUMMARY OF THE INVENTION

The present invention relates to an epoxy-containing composition comprising the acetone soluble reaction product of a major amount of a polyepoxide and a minor amount of a reactive carboxyl group containing polymer and 2,2-bis(4-hydroxyphenyl)sulfone.

The present invention also relates to a process for preparing an acetone soluble epoxy-containing composition which comprises reacting a major amount of a polyepoxide with a minor amount of a reactive carboxyl group containing polymer in the presence of from 0.05 to 3 percent by weight of the reactants of a catalyst selected from the group consisting of tertiary amines, quaternary ammonium salts, organo-substituted phosphines and phosphonium halides and a minor amount of 2,2-bis(4-hydroxyphenyl)sulfone.

DESCRIPTION OF THE INVENTION

The polyepoxides to be used in preparing the compositions of the present invention comprise those materials possessing more than one vicinal epoxy group, i.e., more than one

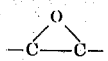

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are those having an epoxy equivalency greater than 1.0.

Various examples of polyepoxides that may be used in the process of the invention are given in U.S. Pat. No. 2,633,458 and it is to be understood that so much of the disclosure of that patent relative to examples of polyepoxides is incorporated by reference into this specification.

Other examples include the epoxidized esters of polyethylenically unsaturated monocarboxylic acids, such as epoxidized linseed, soybean, perilla, oiticia, tung, walnut and dehydrated castor oil, methyl linoleate, butyl linoleate, ethyl 1, 12-octadecadienoate, butyl 9,12,15-octadecatriencate, butyl eleostearate, monoglycerides of tung oil fatty acids, monoglycerides of soybean oil, sunflower, rapeseed, hempseed, sardine, cottonseed oil, and the like.

Another group of epoxy-containing materials used in the process of the invention include the epoxidized esters of unsaturated monohydric alcohols and polycarboxylic acids, such as, for example, di(2,3-epoxybutyl) adipate, di(2,3-epoxybutyl)oxalate, di(2,3-epoxy-hexyl)succinate, di(3,4-epoxybutyl)maleate, di(2,3-epoxyoctyl)pimelate, di(2,3-epoxybutyl)phthalate, di(2,3-epoxyoctyl)tetrahydrophthalate, di(4,5-epoxydodecyl)maleate, di(2,3-epoxybutyl)terephthalate, di(2,3-epoxypentyl)thiodipropionate, di(5,6-epoxytetradecyl) diphenyldicarboxylate, di(3,4-epoxyheptyl)-sulfonyldibutyrate, tri(2,3-epoxybutyl)1,2,4-butanetricarboxylate, di(5,6-epoxypentadecyl)tartarate, di(4,5-epoxytetradecyl)maleate, di(2,3-epoxybutyl)azelate, di(3,4-epoxybutyl)citrate, di(5,6-epoxyoctyl) cyclohexane-1, 2-dicarboxylate, di(4,5-epoxyoctadecyl)-Malonate.

Another group of the epoxy-containing materials includes those epoxidized esters of unsaturated alcohols and unsaturated carboxylic acids, such as 2,3-epoxybutyl-3,4 -epoxypentanoate, 3,4-epoxypentanoate, 3,4-epoxycyclohexyl-3, 4-epoxycyclohexanoate, 3,4-epoxycyclohexyl-4,5-epoxyoctanoate,2,3-epoxycyclohexylmethyl epoxycyclohexane carboxylate.

Still another group of the epoxy-containing materials includes epoxidized derivatives of polyethylenically unsaturated polycarboxylic acids, such as, for example, dimethyl 8,9,12,13-diepoxyeicosanedioate, dibutyl 7,8,11,12-diepoxyoctadecanedioate, dioctyl 10,11-diethyl-8,9,12,13-diepoxyeiconsanedioate, dihexyl 6,7, 10,11-diepoxyhexadecanedioate, didecyl 9-epoxyethyl-10,11-epoxyoctadecanedioate, dibutyl 3-butyl-3,4,5,6-diepoxycyclohexane-1,2-dicarboxylate, dicylohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienoic acid with ethylene glycol, the polyester obtained by reacting diethylene glycol with 2-cyclohexene-1,4-dicarboxylic acid and the like, and mixture thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Another group comprises the glycidyl containing nitrogen compounds, such as diglycidyl aniline and di-and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in the above-noted U.S. Pat. No. 2,633,458 are good examples of polyepoxides of this type. Other examples include the polyglycidyl ether of 1,1,2,2-tetrakis (4-hydroxyphenyl)ethane (epoxy value of 0.45eq/100 and melting point 85°C), polyglycidyl ether of 1,1,5,5-tetrakis(hydroxyphenyl)pentane (epoxy value of 0.514 eq/100g) and the like and mixtures thereof. Other example include the glycidated novolacs as obtained by reacting epichlorohydrin with novolac resins obtained by condensation of aldehyde with polyhydric phenols.

The second component to be used in preparing the new reaction products of the present invention are reactive, carboxyl group containing polymers which contain a plurality of free carboxyl groups. These polymers may be high molecular weight products, but preferably have molecular weights varying from 2,000 up to about 500,000 as determined by the light scattering technique. The carboxyl groups present in the polymer molecular may be on the terminal monomer units or may be in internal positions. The carboxyl groups may be inserted in the polymer molecular by a variety of techniques, such as by conversion of the CN group of carboxyl groups or by use of monomers in the initial polymerization, such as acrylic or methacrylic acids. Other monomers may also be utilized in the formation of the polymers, such as, for example other monomers containing ethylenic groups, such as butadiene, isoprene, dimethylpentadine, ethylene propylene, methacrylonitrile, methyl acrylate, ethyl acrylate, styrene, alpha-methylstyrene, chlorostyrene, vinylpyridine allyl alcohol, vinyl acetate, vinyl butyrate, allyl acetate, diallyl phthalate, divinyl succinate, vinyl chloride, vinylidene chloride, ethylene glycol dimethacrylate, methyl methacrylate, butyl methacrylate, dihydroxybutyl methacrylate, and the like and mixtures thereof. These other monomers are preferably utilized in amounts varying from 90 to 1 percent by weight of the monomer. The above polymers may be prepared by any conventional technique, such as heating the monomers, alone or in the presence of a solvent, such as benzene or xylene, in the presence of a free radical yielding catalyst, such as hydrogen peroxide, ditertiary butyl peroxide, tertiary butyl perbenzoate, tertiary butyl peracetate, tertiary butyl perbutyrate and the like. These catalysts are preferably utilized in amounts varying from 0.1 to 5 percent by weight. Temperatures employed in the polymerization depend on the decomposition temperature of the catalyst and preferably vary from about 60° to about 150° C.

Particularly preferred polymer to be utilized comprises a polymer of acrylonitrile and butadiene having a molecular weight ranging from about 2,000 to 10,000 and having a plurality of free carboxyl groups distributed on the polymer chain. Also of special interest are the terpolymers made up of acrylonitrile, butadiene and methacrylic acid having a molecular weight from 3,000 to about 500,000.

The amount of reactive carboxyl group containing polymers which may be used in the present invention ranges from about 5-35 percent and preferably about 10-20 percent by weight of the polyepoxide.

The compositions described in the present invention are prepared by reacting the 2,2-bis(4-hydroxyphenyl)sulfone and a reactive, carboxyl group containing polymer with the polyepoxide in the presence of the hereinafter described catalysts. Catalysts which may be used in the preparation of the reaction product include tertiary amines, quaternary ammonium salts, organo-substituted phosphine and phosphonium halides.

The tertiary amines that may be used as catalysts are those mono- or polyamines having an open chain or cyclic structure which have all of the amine hydrogen replaced by suitable substituents, such as hydrocarbon radicals and preferably aliphatic, cycloaliphatic or aromatic radicals.

Examples of these amines include, among others, methyl diethanol amine, triethylamine, tributylamine, dimethyl benzylamine, tripheylamine, tricyclohexylamine, pyridine, quinoline, and the like. Preferred amines are the trialkyl, tricycloalkyl and triaryl amines such as triethylamines, triphenylamines, tri(2,3-dimethylcyclohexylo)amine, and the alkyl dialkanol amines, such as methyldiethanol amines. Weak tertiary amines, e.g., amines that in aqueous solutions give a pH less than 10, are particularly preferred.

The quaternary ammonium salts that may be used as catalysts for the reaction are preferably those of the formula

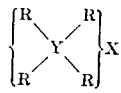

wherein Y is nitrogen, X is an ion of an inorganic acid, and R is a hydrocarbon radical, such as an alkyl, cycloalkyl, aryl, alkaryl, arylalkyl, and the like radicals. Examples of these salts include, among others, benzyltrimethylammonium chloride, benzyltrimethylammonium sulfate, benzyltrimethylammonium nitrate, diphenyldimethylammonium borate, diphenyldimethylammonium nitrate and the like.

Particularly preferred quaternary ammonium salts are those of the above formula wherein R is an alkyl, aryl, or arylalkyl radical, preferably containing no more than 12 carbon atoms and X is a chlorine or bromine, such as benzyltrimethylammonium chloride, benzyltrimethylammonium bromide, cyclohexyltrimethylammonium bromide, phenyltrioctylammonium chloride and tetraoctylammonium chloride.

The organo-substitued phosphines that may be used as catalysts may be exemplified by the formula $P(R)_3$ wherein at least one R is an organic radical and the other R's are hydrogen or organic radicals which may be the same or different from the first R. Preferred phosphines include the trihydrocarbyl phosphines, the dihydrocarbyl phosphines and monohydrocarbyl phosphines, such as tricyclohexyl phosphine, tripenyl phosphine, trioctyl phosphine, diphenyl cyclohexyl diphenyl phosphine, tributyl phosphine, trixylyl phosphine, tridodecyl phosphine, cyclohexyl octyl phosphine and the like. Particularly preferred phosphines include the trialkyl, the tricycloalkyl, the tri(alkylcycloalkyl), and the triaryl and tri(alkaryl) phosphines and particularly those wherein each of the hydrocarbon radicals attached to the phosphorus atom contains no more than 12 carbon atoms, and still more preferably no more than eight carbon atoms, with a total number of carbon atoms preferably not being more than 30. Coming under special consideration, particularly because of their high degree of activity as catalysts are the aromatic hydrocarbyl phosphines as triphenyl phosphine.

The phosphonium halides that may be used as catalyst for the reaction are those preferably having the formula

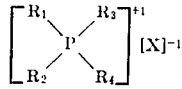

wherein X is a halogen atom, and $R_1$, $R_2$, $R_3$, and $R_4$ are the same or different and represent hydrocarbon residues which may or may not be substituted by one or more functional groups, such as halogen atoms. These phosphonium halides may generally be prepared by mixing in approximately equimolar proportions, a phosphine with a halide. A more detailed description of the phosphonium halides may be found in U.S. Pat. No. 3,477,990 and such part of that patent which describes the phosphonium halides is hereby incorporated by reference.

These catalysts are preferably used in amounts preferably varying from about 0.05 to 3 percent by weight of the reactants.

Temperatures employed in the reaction will generally vary from about 50° to about 150°C. In most cases, the elastomeric components and the polyepoxides will be quiet reactive and temperatures of the order of about 50°to 125°C will be sufficient to effect the desired reaction. In other instances, it may be desirable to use higher temperatures, such as those from 125° to 175°C. Temperatures of 200° C. or over should generally not be employed.

The reaction is preferably conducted under atmospheric pressure, but may be advantageous in some cases to employ subatmospheric or superatmospheric pressures.

The reaction may be conducted in the presence or absence of solvents or diluents, though it is generally effected without the addition of solvents or diluents. In some cases, when some of the reactants are solids or viscous liquids it may be desirable to add diluents to assist in effecting the reaction, such as, for example, inert hydrocarbons as zylene, toluene, cylohexane, and other materials as cyclohexanone, and the like.

As the compositions of the present invention possess epoxy groups, they may be cured with epoxy curing agents to form insoluble infusible products. For this purpose, epoxy curing agents which are acidic, neutral or alkaline may be added. Examples of the curing agents include, among others, amines, polybasic acids and polybasic acid anhydrides, polymercaptans, amino-containing polyamides, diazonium salts, metal salts, amine salts, etc. Examples of the curing agents include, among others, meta-phenylene diamine, dicyandiamide, diethylene triamine, ethylene diamine, diamino-diphenyl-sulfone, salts, such as zinc fluoborate, magnesium perchlorate and zinc fluosilicate; phosphoric acid and partial esters thereof including n-butyl ortho-phosphate, diethyl orthophosphate hexaethyl tetraphosphate; triethylene tetramine, melamine, pyridine, cyclohexylamine, benzyldimethyl-amine, benzylamine, diethylaniline, triethanolamine, piperidine, tetramethyl piperazine, N,N-diethyl-1-1,3-propane diamine, 1,2-diamino-2-methylpropane, 2,3-diamino-2-methylbutane, 2,4-diamino-2-methylpentane, 2,4-diamino-2,6-dimethylocatane, dibutylamine, dinonylamine, distearylamine, diallyl amine, dicyclohexylamine, ethylcyclohexylamine, O-tolylnapthtylamine, pyrrolidine, 2-methyl-pyrrolidine, tetrahydropyridine, 2-methylpiperdine, 2,6-dimethyl-piperidine, diaminopyridine, tetramethylpentane, metaphenylene diamine, and the like, and soluble adducts of amines and polyepoxides and their salts, such as described in U.S. Pat. No. 2,651,589 and U.S. Pat. No. 2,640,037. Preferred curing agent are the amines and preferably the aromatic mono- and diamines.

Accelerators may also be used in conjunction with curing agents in the present invention. Accelerators act to hasten cure and include substituted imidazoles and salts thereof, such as, for example, 2-ethyl-4-methylimidazole and the lactic acid salt of imidazole. Acetyl guanidine and p-chlorophenyl-1,1-dimethylurea may also be used. Accelerators are used in amounts of 1–40 parts and preferably 5–20 parts by weight of curing agent.

The amount of the curing agent employed may vary widely. In general, the amount of the curing agent will vary from about 0.5 to 200 percent by weight of the polyepoxide. The tertiary amines and $BF_3$-complexes are preferably employed in amounts varying from about 0.5 to 20 percent and the metal salts are preferably employed in amounts varying from about 1 percent to 15 percent. The secondary and primary amines, acids and anhydrides are preferably employed in at least stoichiometric amounts, i.e., sufficient amount to furnish one amine hydrogen for one anhydride group for every epoxy group, and more preferably stoichiometric ratios varying from 1:1 to 25:1.

The third component to be used in preparing the present invention is 2,2-bis(4-hydroxyphenyl)sulfone (Bisphenol S):

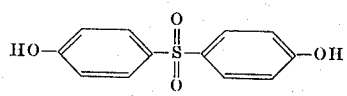

BISPHENOL S

Bisphenol S is a commercially available compound (WITCO Chemical Company) available in 99 percent 4,4-isomer purity, having 99 percent active sulfone and a melting point of 245°–248° C. The amount of Bisphenol S which may be used in the present invention ranges from about 5–35 percent and preferably from about 15–25 percent by weight of the polyepoxide.

The compositions of the present invention are useful in a great variety of different applications, such as in preparing adhesives and the like. The compositions may be used for bonding materials, such as glass-to-glass, metal-to-metal, glass-to-metal, wood-to-wood, and the like. They are particularly valuable as adhesives for bonding glass cloth to glass, and metal to glass, for example, when applied to the desired surfaces to form films of various thickness, e.g., 5 mils to 30 mils and then the other surfaces superimposed and heat and/or pressure applied. The two surfaces may be also placed in a fixed position relative to each other and the adhesive forced between the surfaces, pressure applied, and the assembly heated to about 100° to 300° C to effect cure.

The compositions are of value as adhesives for metal-to-metal bonding. In this case, it has been found advantageous to impregnate cotton, rayon, and woven, knitted and non-woven cloth of synthetic fiber or glass cloth textiles with the composition, and then use the impregnated textile as a bonding tape for joining the metals. Such tapes provide convenient means for handling and using the compositions in adhesive applications. The tape is inserted between two metals to be joined, and the assembly is then preferably heated to speed the cure of the resin. A preferred tape for such use has a nylon fiber textile impregnated with a mixture containing the adduct, an amine curing agent, silica and/or asbestos filler.

The compositions are also useful for preparing surface coating compositions. In this application, the composition is usually mixed with one or more of suitable solvents or diluents, such as, for example, ketones, such as methyl isobutyl ketone, acetone, methyl ethyl ketone, isophorone, esters, such as ethyl acetone, cellosolve acetate (ethylene glycol monoacetate), methyl cellosolve acetate (acetate of ethylene glycol monoethyl ether), etc.; ether alcohols, such as methyl, ethyl, or butyl ether of ethylene glycol or diethylene glycol, chlorinated hydrocarbons, such as trichloropane; hydrocarbons, such as benzene, toluene, xylene and the like, to give a mixture having suitable viscosity for spraying, brushing or dipping, and then the necessary curing agent as described above may be added alone or in admixture with a suitable solvent. The cure of the coating compositions thus prepared may be preferably accomplished by the application of heat. Satisfactory cures are obtained generally with temperatures of 60° up to 200°C.

Additional materials may be added in the preparation of the coating compositions to vary the properties. Such materials include pigments, dyes, stabilizers, plasticizers and various bonding agents as oils, resins and tars. Materials such as coal tars, asphalts, and the like are particularly desirable for use when the coatings are to be employed for the treatment of roadways, floors and the like.

The coatings prepared from the compositions of the invention are characterized, as noted above, by their toughness, chemical resistance, good adhesion and improved high temperature shear strength.

Another important application of the products of the invention is in the production of laminate or resins or resinous articles reinforced with fibrous materials. Although it is generally preferred to utilize glass cloth for this purpose, any of the other suitable fibrous materials in sheet form may be employed, such as glass matting, paper, asbestos paper, mica flakes, cotton bats, duck muslin, canvas, and the like.

In preparing the laminate, the sheets of fibrous material are first impregnated with the mixture containing the composition described in the present invention and curing agent. This may be accomplished by a hot-metal technique or by dissolving the composition and curing agent in acetone or a suitable solvent. In the latter instance, the sheets of fibrous material are then impregnated with the mixture by spreading it thereon or by dipping or otherwise immersing them in the impregnant. The solvent is conveniently removed by evaporation and the mixture is cured by the application of heat as noted above.

Another important use of the compositions of the invention is the production of molded articles. A molding powder is first prepared by milling together a mixture of the composition and curing agent with customary fillers and mold release agents. Usually the milled mixture is set up so that a fusible resin is first obtained. The milled mixture is then ground and molded articles obtained therefrom with conversion of the fusible resin into the infusible state with use of molding machines such as those for compression molding or transfer molding. If desired, fusible milled mixture may be prepared in pre-form pellets and the like.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight. Polyether A referred to in the examples is Polyether A described above.

EXAMPLE I

Two formulations were prepared as follows:

FORMULATION 1 2

| | | |
|---|---|---|
| Polyether A[1] | 103.5 | 103.5 |
| Bisphenol S[2] | 18 | — |
| Catalyst[3] | 0.2 | 0.2 |
| Carboxyl Group Containing Polymer[4] | 15 | 15 |
| Accelerator[5] | 1.0 | 1.0 |
| Bisphenol A[6] | — | 18 |
| Curing agent[7] | 8 | 8 |

(1) Polyether A: Diglycidyl ether of 2,2-bis(4-hydroxyphenyl)propane having an epoxide equivalent of 175–210 (grams of resin containing one gram-equivalent of epoxide) and a molecular weight of about 380.
(2) Bisphenol S: 2,2-bis(4-hydroxyphenyl)sulfone
(3) Catalyst: Triphenyl Phosphine
(4) Carboxyl group containing polymer: Acrylonitrile-butadiene copolymer having a molecular weight of 3365, an acrylonitrile content of about 80%, a carboxyl equivalency of 1540 (functionality of 2.34) and unsaturation in the polymer of 16.3% cis, 68.7% trans and 15% vinyl.
(5) Accelerator: 2-ethyl-4-methylimidazole
(6) Bisphenol A: 2,2-bis(4-hydroxyphenyl)propane

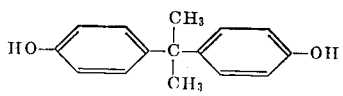

(7) Curing agent: Dicyandiamide

Formulations 1 and 2 were then identically prepared as follows:

The Polyether A, Bisphenol S (in Formulation 1), Bisphenol A (in Formulation 2), catalyst and carboxyl group containing polymer were combined and heated for one hour at between 130° and 160°C. The resulting reaction products were soluble in acetone. To these reaction products was added the curing agent and accelerator.

Tapes were made by spreading the mixtures as a thin film (about 3.5 mils) on both sides of a knitted nylon cloth. The following test specimens were assembled and cured for 1 hour at 250°F. Table 1 below tabulates the resulting data from the testing of the specimens.

TABLE 1

| FORMULATION | 1 | 2 |
|---|---|---|
| Tensile Shear Strength (psi) | | |
| 77°F | 6500 | 6450 |
| 250°F | 3210 | 1010 |

Of specifical significance was the 250° F tensile shear strength improvements. As indicated in Table 1, while ambient temperature tensile shear strengths are comparable, the composition containing Bisphenol S had over three times the tensile shear strength at 250°F as the composition with Bisphenol A, a structurally similar compound.

EXAMPLE II

Two Formulations were prepared as follows:

| FORMULATION | 3 | 4 |
|---|---|---|
| Polyether A[1] | 103.5 | 103.5 |
| Rubber copolymer[2] | 5.0 | 5.0 |
| Carboxyl Group Containing Polymer[3] | 10.0 | 10.0 |
| Bisphenol A[4] | 21.0 | — |
| Bisphenol S[5] | — | 23.0 |
| Catalyst[6] | 0.2 | 0.2 |
| Curing agent[7] | 8.0 | 8.0 |
| Accelerator[8] | 1.0 | 1.0 |

(1) Polyether A: Footnote 1, EXAMPLE 1.
(2) Rubber Copolymer: A solid acrylonitrile-butadiene copolymer having a molecular weight of 300,000 and an acrylonitrile content of about 80%.
(3) Carboxyl Group Containing Polymer: Footnote 4, EXAMPLE 1.
(4) Bisphenol A: Footnote 6, EXAMPLE I.
(5) Bisphenol S: Footnote 2, EXAMPLE I.
(6) Catalyst: Triphenyl Phosphine
(7) Curing agent: Dicyandiamide
(8) Accelerator: p-chlorophenyl-1,1-dimethylurea Formulations 3 and 4 were then identically prepared as follows:

The Polyether A, Bisphenol S (in formulation 4), Bisphenol A (in formulation 3) catalyst, rubber copolymer and carboxyl group containing polymer were combined and heated for 1 hour at 150°C. The resulting reaction products were soluble in acetone. To these reaction products were added the curing agent and accelerator.

Tapes were made by spreading these mixtures as a thin film (5mils) on both side of nylon cloths. The following test specimens were assembled and cured for 1 hour at 250°C and 25 psi. Table 2 below tabulates the resulting data from the testing of the specimens.

TABLE 2

| FORMULATION | 3 | 4 |
|---|---|---|
| Tensile Shear Strength (psi) | | |
| 77°F | 6590 | 6050 |
| 250°F | 1235 | 3350 |

Of special significance was the 250°F tensile shear strength improvements. As indicated in Table 2, while ambient temperature tensile shear strengths were comparable, the composition containing Bisphenol S had approximately three times the tensile shear strength at 250°F as the same composition containing an equivalent amount of Bisphenol A in place of the Bisphenol S.

EXAMPLE III

Example I is repeated except that equivalent amounts of the following polyepoxides are utilized instead of polyether A: Polyglycidyl ether of phenol-formaldehyde novolac (DEN 438)[1], a phenoxy copolymer of Bisphenol A and Epichlorohydrin (PKDA–8500)[2], EPON 1001[3] and the diglycidyl ether of tetrabromobisphenol A (DER 542)[4]. Related results are achieved.
(1) DEN 438: polyphenol-formaldehyde poly(2,3-epoxypropyl)ether. Epoxy eq/100g of 0.56.
(2) PKDA-8500: MW of about 25,000, Secondary hydroxyl: 6% by weight.
(3) EPON 1001: Glycidyl ether of 2,2-bis(4-hydroxyphenyl) propane having an epoxy eq/100g of 0.23.
(4) DER 542: 2,2-bis[4-(2,3-epoxypropoxy)-3,5-dibromophenyl]propane. Epoxy eq/100g of 0.28.

EXAMPLE IV

Example I is repeated, except that the following curing agents are used instead of dicyandiamide: melamine, dimethyldiphenyl sulfone and M-phenylene diamine. Related results are achieved.

EXAMPLE V

Example I is repeated, except that the following catalysts are used instead of triphenyl phosphine: benzyltrimethylammonium chloride, methyl diethanol amine and triethyl amine. Related results are achieved.

We claim:
1. An epoxy-containing composition comprising the acetone soluble reaction product of a major amount of a polyepoxide having more than one 1,2 epoxy group per molecule and about 5–35 percent by Weight of a carboxyl group containing addition copolymer and about 5–35 percent by weight of 2,2-bis(4-hydroxyphenyl)sulfone.

2. A composition suitable for use as an adhesive comprising the reaction product of claim 1 additionally containing an epoxy curing system.

3. An insoluble infusible product obtained by heating the composition of claim 2 at a temperature between about 50° and 200°C.

4. A composition as in claim 2 wherein the polyepoxide is a liquid glycidyl polyether of a polyhydric phenol.

5. A composition as in claim 4 wherein the polyhydric phenol is 2,2-bis(4-hydroxyphenyl)propane.

6. A composition as in claim 2 wherein the epoxy curing system includes an accelerator.

7. A composition as in claim 2 wherein the reactive, carboxyl group containing polymer is a polymer which contains at least 10 percent by weight of acrylonitrile units and a plurality of free carboxyl groups.

8. A composition as in claim 7 wherein the reactive, carboxyl group containing polymer is a copolymer of acrylonitrile and butadiene having a plurality of free carboxyl groups distributed on the polymer chain.

9. An insoluble, infusible epoxy containing composition comprising the cured reaction product of a major amount of the diglycidyl ether of 2,2-bis(4-hydroxylpenyl)propane, and about 5–35 percent by weight of a copolymer of acrylonitrile and butadiene having a plurality of free carboxyl groups and about 5–35 percent by weight of 2,2-bis(4-hydroxyphenyl)sulfone.

10. A process for preparing an acetone soluble epoxy-containing composition which comprises reacting at a temperature of about 50°–175°C.
  1. a major amount of a polyepoxide having more than one 1,2 epoxy group per molecule with
  2. about 5–35 percent by weight of a carboxyl group containing addition copolymer in the presence of from 0.05 to 3 percent by weight of the reactants of a catalyst selected from the group consisting of tertiary amines, quaternary ammonium salts, organo-substituted phosphine and phosphonium halides and
  3. about 5–35 percent by weight of 2,2-bis(4-hydroxyphenyl)sulfone.

11. A process as in claim 10 wherein the polyepoxide is a glycidyl polyether of a polyhydric phenol.

12. A process as in claim 10 wherein the catalyst is triphenyl phosphine.

13. A process as in claim 12 wherein the polyepoxide is the glycidyl polyether of 2,2-bis(4-hydroxyphenyl)-propane.

14. A process as in claim 10 wherein the reactive, carboxyl group containing polymer is a polymer which contains at least 10 percent by weight of acrylonitrile units and a plurality of free carboxyl groups.

15. A process as in claim 13 wherein the reactive, carboxyl group containing polymer is a copolymer of acrylonitrile and butadiene having a plurality of free carboxyl groups distributed on the polymer chain.

* * * * *